United States Patent Office 3,340,766
Patented Sept. 12, 1967

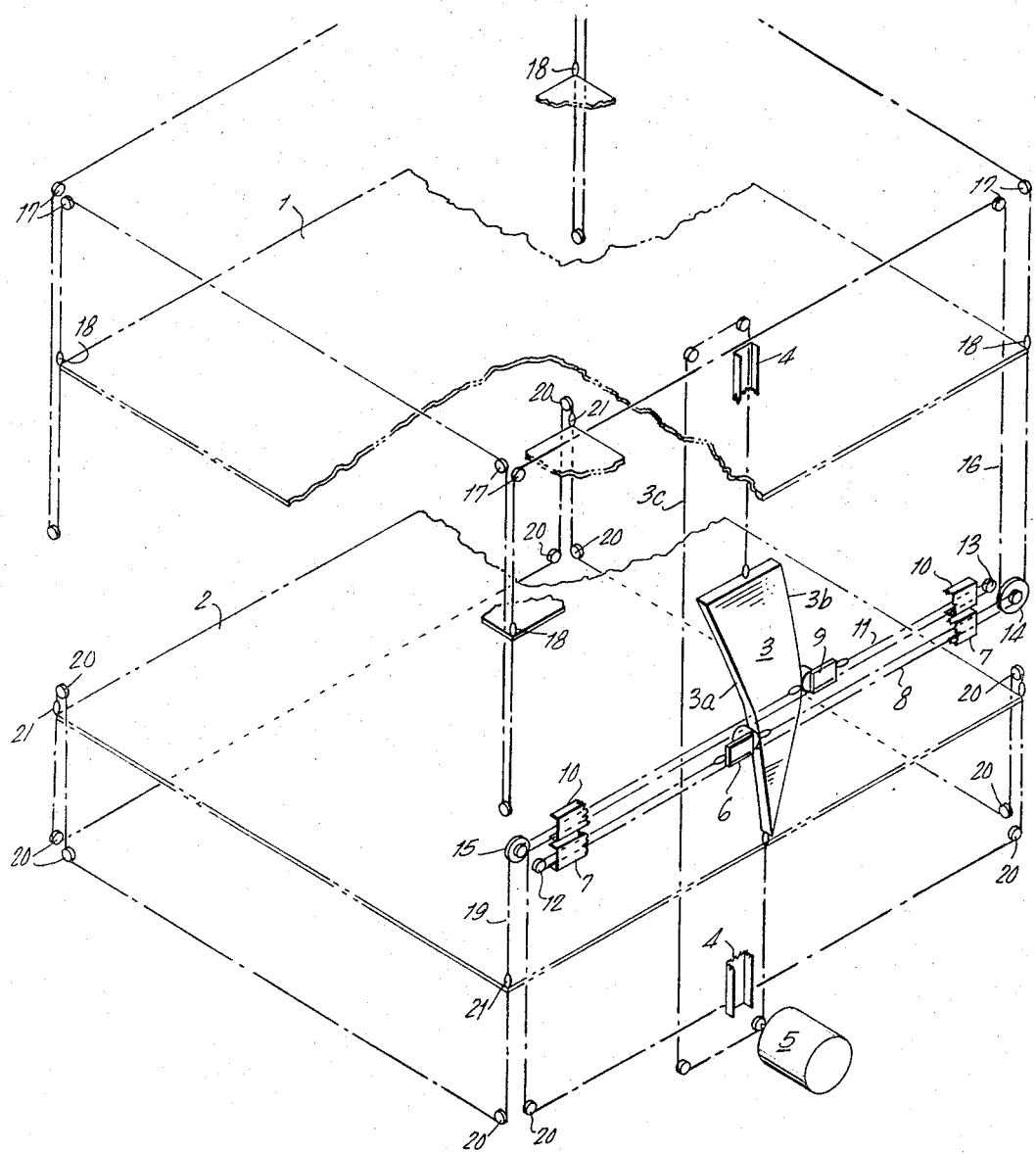

3,340,766
AUTOMATIC FOCUSING OPTICAL SYSTEM
Murray Friedel, North Miami Beach, Fla., assignor to Visual Graphics Corp., New York, N.Y., a corporation of New York
Filed Feb. 2, 1965, Ser. No. 429,767
3 Claims. (Cl. 88—24)

ABSTRACT OF THE DISCLOSURE

An automatic focusing optical system employing a movably positioned double cam, an object holder, lens holder and a photosensitive record holder. Mechanical amplifiers respectively connected to each of the lens and record holders and the first and second surfaces of the double cam through cam followers and linkages provide changes in positions of the lens and record holders with respect to each other and with respect to the object holder.

---

This invention relates to an improved optical system. In particular, this invention relates to an improved automatically-focusing optical system, particularly useful as applied to a reproduction camera or the like.

In any type of camera or similar optical system involving a focusing lens, there are three essential elements to be considered, namely the object, the lens, and the image. In a reproduction camera for example, the object is a suitable holder for a page, photograph, or other flat object to be copied. Where it is sufficient to employ a uniform degree of magnification or reduction for all material copied the lens and the image plane—that is, the film-holder—may be located at fixed distances from the object plane such that the image is always in focus.

In most cases, however, it is desired to provide greater flexibility in the apparatus, so that the size of the image may be magnified, reduced, or kept the same as the size of the object. In order to achieve this flexibility it is necessary to make the three elements relatively movable. This is ordinarily done by locating one of them in a fixed position and making the other two movable. In a reproduction camera the object plane is usually fixed while the lens and the film-holder or image plane are movable. In an enlarger the image plane is ordinarily fixed and the object (i.e. the photographic negative or the like) and the lens are movable.

In the simpler types of apparatus it is common to adjust the positions of the two movable elements by hand, first adjusting the movable object or image plane to give the approximate magnification or reduction desired, then adjusting the position of the lens to provide a sharp focus, as determined by visual inspection. This, in turn, further changes the degree of magnification so that another slight change in the position of the film holder or object is required, and so forth. This method is tedious and uncertain, particularly where a precise degree of magnification or reduction is required. It also depends on the judgment of the operator to produce a sharp focus and this is very difficult to judge in many cases.

To overcome these difficulties, various types of automatically-focusing or "autofocus" equipment have been proposed. Such apparatus is designed to maintain a fixed relationship between the three aforesaid elements by automatically moving the lens whenever the other movable element is moved, in such a way that the image remains always in focus. The design of such equipment is complicated, however, by the fact that there is no simple proportional relationship between the required distances. Rather, the distances must conform to the appropriate lens equation. In its simplest form, the relationship may be expressed by the equation:

$$\frac{1}{s}+\frac{1}{s'}=\frac{1}{f}$$

where $s$ is the distance between the object and the first principal point of the lens (or the center of a thin lens), $s'$ is the distance between the second principal point of the lens (or center, if a thin lens) and the image, and $f$ is the focal length of the lens.

This non-linear relationship is not readily translated into mechanical terms, and various complicated systems have been proposed. In general, these suffered from the common disadvantage that they either lacked sufficient accuracy for critical work or else were difficult and expensive to construct.

An object of this invention, therefore, is to provide improved automatically-focusing optical apparatus.

Another object is to provide autofocusing optical apparatus that is simple in design and inexpensive to build, and capable of being made to a high standard of accuracy.

A feature of the invention is the use of a pair of camming surfaces operating in unison to control the positions of two of the three relatively movable elements of the system.

Another feature is the use of one double-acting cam provided with two camming surfaces.

Another feature is the use of mechanical amplifiers to increase the amplitude of response to the cam.

Still another feature is the use of a tension-supported system for positioning the movable elements, rather than supporting them in compression from below.

Other objects, features and advantages will become apparent from the following more complete description and claims, and with reference to the accompanying drawing.

The invention consists in the form, selection and arrangement of elements as more fully described hereinafter.

In one particularly desirable embodiment this invention contemplates an automatically-focusing optical apparatus comprising in combination at least three relatively movable elements including an object plane, a lens and an image plane, a cam element having a first camming surface and a second camming surface, means for varying the position of said cam element, a first follower in contact with said first camming surface, a first mechanical amplifier, linkage means connecting said first follower with said first mechanical amplifier, linkage means connecting said first mechanical amplifier with a first of said three relatively movable elements, a second follower in contact with said second camming surface, a second mechanical amplifier, linkage means connecting said second follower with said second mechanical amplifier, and linkage means connecting said second mechanical amplifier with a second of said three relatively movable elements, whereby a change in the position of said cam element effects a change in the positions of said first and second relatively movable elements with respect to each and with respect to said third relatively movable element.

Referring now to the drawing, FIGURE 1 is a somewhat diagrammatic isometric view of an autofocusing camera according to an embodiment of the invention with some parts broken away.

In the embodiment of the invention illustrated in FIGURE 1 the camera comprises a lens board 1 which is provided in the conventional way with a central aperture containing a lens (not shown). Situated below lens board 1 is a film carrying surface 2. At one side of the apparatus is a double-acting cam 3. Cam 3 is provided with one or more projections (not shown) which slide in ways 4, limiting the motion of the cam to straight up-and-down travel, preventing any tendency for the cam to be displaced horizontally or rotated by the back-pressure of the cam followers.

The two generally vertical sides of the cam are shaped to provide a first camming surface 3a and a second camming surface 3b. The cam is moved upward or downward as desired by actuating means represented by motor 5 operating through cable 3c.

Bearing against first camming surface 3a is a first follower 6. Follower 6, which is the lens-board follower, slides in horizontal ways 7 and is connected through roller chain 8. Chain 8 connects follower 6 with a mechanical amplifier in the form of sprocket 14 and is kept taut by a tensioning sprocket 12.

Sprocket 14 is a step-up sprocket, having a ratio of, for example, 3 to 1. The smaller step is a roller chain sprocket to accommodate chain 8 and the larger step is a bead chain sprocket three times the diameter of the roller chain sprocket.

The larger step of step-up sprocket 14 accommodates bead chain 16. Chain 16 is led over suitable sheaves 17 and supports the corners of the lens board at four points of connection 18.

Contacting the second camming surface 3b is a second cam follower 9. This is the film holder cam. Follower 9 is connected by way of roller chain 11 to step-up sprocket 15. Tension on chain 11 is maintained by tensioning sprocket 13.

Step-up sprocket 15 which functions as a mechanical amplifier for motions of follower 9 may suitably be a 2 to 1 step-up sprocket. The smaller step is a roller chain sprocket to accommodate chain 11, and the larger step is a bead chain sprocket twice the diameter of the roller chain sprocket.

The larger step of step-up sprocket 15 accommodates bead chain 19. Chain 19 is led over suitable sheaves 20 and supports the corners of film holder 2 at four points of connection 21.

The apparatus is completed by a suitable object support which may suitably be a glass plate or an easel (not shown) located at a fixed position above and parallel with lens board 1 and film holder 2 and a suitable light-tight housing (not shown).

From the construction as just described it will be obvious that any motion of cam follower 6 is amplified threefold by step-up sprocket 14 and transmitted to lens board 1 as a corresponding vertical displacement. Similarly, any motion of follower 9 is doubled by step-up sprocket 15 and transmitted to film holder 2 as a vertical displacement.

The required shapes for the camming surfaces may be readily generated in a variety of ways, as will be obvious to those skilled in the art. The conformation of one of the surfaces may be selected somewhat arbitrarily and the required configuration of the other surface computed therefrom.

Preferably, however, the surfaces are generated so as to provide a simple relationship between the longitudinal displacement of the cam (i.e. the vertical displacement thereof, as seen in FIGURE 1) and the degree of magnification achieved.

A convenient starting point is that which gives the maximum magnification possible, as limited by the dimensions of the apparatus. At this point the distance from the object holder to the film holder is at a maximum and the position of the lens may be computed from the lens equation, taken together with the known fact that $s+s'$ is equal to the distance between the object holder and the film holder.

Corresponding points are selected as the starting points for cam surfaces 3a and 3b, respectively.

The cam surfaces can then be generated by taking successive increments along the longitudinal axis of the cam (the vertical axis, as seen in FIGURE 1). For each such increment, the corresponding desired magnification is translated into terms of the required positions of the lens board and the film holder. The vertical displacement of lens board 1 divided by 3 (the effect of the mechanical amplifier), is the required horizontal displacement of cam surface 3a, measured outwardly from a vertical line through the first point selected.

In the same way the corresponding point on cam surface 3b is measured from the original point upwardly by the size of the selected vertical increment and horizontally out to ½ the required vertical displacement of film holder 2.

A smooth curve is faired through the two sets of points thus computed and two curves define the required shapes of camming surfaces 3a and 3b, respectively.

In use, the apparatus is simply operated in much the same manner as any autofocus reproduction camera. The material to be reproduced is placed face down in the object holder, the film or other recording medium is placed on film-holder 2, and cam 3 is moved upwardly or downwardly as required to a position corresponding to the desired magnification. The film is exposed and processed in the conventional manner.

In the apparatus as illustrated, the maximum magnification is achieved when the film holder is in its lowermost position and cam 3 is in its uppermost position. As the cam is drawn downward cam follower 6 is displaced to the left, which in turn causes lens board 1 to be displaced upwardly by three times the amount of the displacement of follower 6. At the same time follower 9 is displaced to the right which causes film holder 2 to move upwardly twice the distance through which follower 9 is displaced.

Although described above with particular reference to a reproduction camera, the invention is equally applicable to other types of optical apparatus in which a focused condition must be preserved while the positions of one or more elements of the system are changed. Examples of such other types of apparatus include photographic enlargers and "zoom"-type variable focal-length lenses.

The optical systems to which the present invention is applicable have the common property that they have, in each case, at least three relatively movable elements. In the case just described only two of the elements, namely the film holder and the lens board are movable in an absolute sense, the object holder being located at a fixed position. All three elements are properly described as "relatively movable," however, as the expression is used herein, because the position of each is variable relative to the other two.

It is not essential that any one of the elements be in a fixed position, nor that the number of relatively movable elements be restricted to three. If the optical system under consideration requires that more than two elements be moved in order to keep the system in focus, additional elements may be controlled by adding additional camming surfaces similar to surfaces 3a and 3b, additional cam followers similar to followers 6 and 9, etc. The curvature of such additional camming surfaces may readily be developed in the same fashion as outlined above, as will be readily apparent to those skilled in the art.

The position of the cam may be varied in any suitable manner. As shown in FIGURE 1 the cam is moved by means of motor 5. It may equally well be moved manually or by means of a hand crank or the like, if so desired.

The function of the mechanical amplifiers, such as step-up sprockets 14 and 15 is to reduce the amount of displacement of cam followers 6 and 9, respectively, needed to produce a given displacement in the positions of lens board 1 and film holder 2. Without these amplifiers cam 3 would have to be of a size that would make it much larger than a large industrial camera, making it impractical to use. Other types of mechanical amplifiers may be used in place of the sprockets, for example levers or pulleys, but the step-up sprocket, as illustrated, is a particularly compact, inexpensive and reliable arrangement.

The present invention provides improved autofocusing optical apparatus. It is simple in design and inexpensive to build, and is capable of being made to a high degree of accuracy. In the preferred vertical disposition as illustrated in FIGURE 1, the movable elements are supported in tension being suspended from chains or cables. This construction permits the apparatus to be made light in weight without sacrificing stability or accuracy as compared with apparatus in which the movable elements are supported in compression on rigid columns or the like.

While this invention has been described with reference to certain preferred embodiments and illustrated by way of certain drawings, these are illustrative only, and many alternatives and equivalents will occur to those skilled in the art, without departing from the spirit and proper scope of the invention. The invention is therefore not to be construed as limited, except as set forth in the appended claims.

Having thus fully described the invention, what is claimed as new and desired to be secured by Letters Patent of the United States, is:

1. An automatically-focusing optical apparatus comprising in combination at least three relatively movable elements including an object plane, a lens and an image plane, a cam element having a first camming surface and a second camming surface, means for varying the position of said cam element, a first follower in contact with said first camming surface, a first mechanical amplifier, linkage means connecting said first follower with said first mechanical amplifier, linkage means connecting said first mechanical amplifier with a first of said three relatively movable elements, a second follower in contact with said second camming surface, a second mechanical amplifier, linkage means connecting said second follower with said second mechanical amplifier, and linkage means connecting said second mechanical amplifier with a second of said three relatively movable elements, whereby a change in the position of said cam element effects a change in the positions of said first and second relatively movable elements with respect to each other and with respect to said third relatively movable element.

2. An automatically-focusing optical apparatus comprising in combination at least three relatively movable elements including an object holder, a lens and a holder for photosensitive record material, a cam element having a first camming surface and a second camming surface, means for varying the position of said cam element, a first follower in contact with said first camming surface, a first mechanical amplifier, linkage means connecting said first follower with said first mechanical amplifier, linkage means connecting said first mechanical amplifier with said lens, a second follower in contact with said second camming surface, a second mechanical amplifier, linkage means connecting said second follower with said second mechanical amplifier, and linkage means connecting said second mechanical amplifier with said holder for photosensitive material, whereby a change in the position of said cam element effects a change in the positions of said lens and said holder for photosensitive material with respect to each other and with respect to said object holder.

3. An automatically-focusing reproduction camera comprising in combination at least three relatively movable elements including a copyholder, a lens and a film holder, a cam element having a first camming surface and a second camming surface, means for varying the position of said cam element, a first follower in contact with said first camming surface, a first step-up sprocket, a chain connecting said first follower and said first step-up sprocket, a chain connecting said first step-up sprocket and said lens, a second follower in contact with said second camming surface, a second step-up sprocket, a chain connecting said second follower and said second step-up sprocket, and a chain connecting said second step-up sprocket and said film holder, whereby a change in the position of said cam element effects a change in the positions of said lens and said film holder with respect to each other and with respect to said copyholder.

References Cited
UNITED STATES PATENTS

| | | | |
|---|---|---|---|
| 2,655,834 | 10/1953 | Pennington | 88—24 |
| 3,242,800 | 3/1966 | Sanford | 88—24 |

NORTON ANSHER, Primary Examiner.

R. A. WINTERCORN, Examiner.